(12) United States Patent
Mader

(10) Patent No.: US 10,086,341 B2
(45) Date of Patent: Oct. 2, 2018

(54) METHOD AND APPARATUS FOR CHANGING SPACERS

(71) Applicant: LISEC AUSTRIA GMBH, Seitenstetten (AT)

(72) Inventor: Leopold Mader, Neuhofen/Ybbs (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 812 days.

(21) Appl. No.: 14/384,022

(22) PCT Filed: Apr. 2, 2013

(86) PCT No.: PCT/AT2013/000053
§ 371 (c)(1),
(2) Date: Sep. 9, 2014

(87) PCT Pub. No.: WO2013/149273
PCT Pub. Date: Oct. 10, 2013

(65) Prior Publication Data
US 2015/0055434 A1 Feb. 26, 2015

(30) Foreign Application Priority Data

Apr. 5, 2012 (AT) .................................. A 409/2012
May 2, 2012 (AT) .................................. A 522/2012

(51) Int. Cl.
*B01F 5/06* (2006.01)
*B01F 3/12* (2006.01)
(Continued)

(52) U.S. Cl.
CPC .............. *B01F 5/0681* (2013.01); *B01F 3/12* (2013.01); *B01F 7/008* (2013.01);
(Continued)

(58) Field of Classification Search
CPC .... B29B 7/7657; B29C 47/60; B29C 47/6043
See application file for complete search history.

(56) References Cited

U.S. PATENT DOCUMENTS

| | | | |
|---|---|---|---|
| 2,969,960 A | * | 1/1961 | Gurley, Jr. .......... B01F 7/00816 261/DIG. 26 |
| 3,102,716 A | * | 9/1963 | Frenkel .................. B29B 7/425 100/145 |

(Continued)

FOREIGN PATENT DOCUMENTS

| | | |
|---|---|---|
| CA | 2304668 | 4/1999 |
| DE | 20 2008 014823 U1 | 2/2009 |

(Continued)

OTHER PUBLICATIONS

EP Office Action, dated Nov. 23, 2015; Patent Application No. 13720745.2.

(Continued)

*Primary Examiner* — Tony G Soohoo
*Assistant Examiner* — Elizabeth Insler
(74) *Attorney, Agent, or Firm* — Young & Thompson

(57) ABSTRACT

A device for mixing at least two fluid to pasty substances has a housing (2) with at least two openings (5, 6) for feeding the substances and with a discharge opening (8), a mixing element (3) which can rotate in the housing (2), which mixing element (3) can be displaced in the direction (17) of its axis (7) in relation to the housing (2) in order to adjust the size of a gap (18) between a conically tapering part (14) of the mixing element (3) and a likewise tapering region (15) of the housing (2) in order to adjust the shear rate in the region of the gap (18). The mixing element (3) has a region (9) in which annular ribs (11) are provided which project from the mixing element (3) and which engage between (Continued)

adjacent annular ribs (12) which project from the inner surface (10) of the housing (2).

19 Claims, 1 Drawing Sheet

(51) Int. Cl.
| | | |
|---|---|---|
| *B01F 15/00* | (2006.01) | |
| *B01F 7/00* | (2006.01) | |
| *B05B 1/34* | (2006.01) | |
| *B05B 7/04* | (2006.01) | |
| *B29B 7/74* | (2006.01) | |
| *B29B 7/40* | (2006.01) | |
| *B29B 7/76* | (2006.01) | |
| *B29B 7/80* | (2006.01) | |

(52) U.S. Cl.
CPC ...... *B01F 7/00775* (2013.01); *B01F 7/00808* (2013.01); *B01F 7/00816* (2013.01); *B01F 7/00825* (2013.01); *B01F 7/00833* (2013.01); *B01F 15/00058* (2013.01); *B05B 1/34* (2013.01); *B05B 7/0408* (2013.01); *B29B 7/407* (2013.01); *B29B 7/408* (2013.01); *B29B 7/7442* (2013.01); *B29B 7/7657* (2013.01); *B01F 2215/006* (2013.01); *B29B 7/805* (2013.01)

(56) References Cited

U.S. PATENT DOCUMENTS

| | | | | |
|---|---|---|---|---|
| 3,545,680 | A | * 12/1970 | Ottaway | ............... B05B 7/0408 222/571 |
| 3,741,441 | A | 6/1973 | Eberle | |
| 3,836,336 | A | * 9/1974 | Yasui | .................... B01F 1/0011 264/188 |
| 4,128,342 | A | * 12/1978 | Renk | ...................... B29B 7/401 366/303 |
| 4,976,547 | A | * 12/1990 | Hisanaga | ................ B29B 7/408 366/170.3 |
| 5,902,042 | A | * 5/1999 | Imaizumi | ............... B01F 7/008 366/176.2 |
| 6,105,822 | A | * 8/2000 | Larsen | ................. B29B 7/7447 222/134 |

FOREIGN PATENT DOCUMENTS

| | | |
|---|---|---|
| DE | 20 2010 002543 U1 | 8/2010 |
| EP | 1 974 804 A2 | 10/2008 |
| JP | 10-029213 | 2/1998 |
| JP | 10-0616529 | 8/2006 |
| SU | 1082480 | 3/1984 |

OTHER PUBLICATIONS

Korea Office Action dated Dec. 22, 2016; Application No. 10-2014-7030144.

International Search Report, dated Jul. 12, 2013, from corresponding PCT application.

FI Search Report, dated Mar. 12, 2013, from corresponding FI application.

RU Office Action, in corresponding RU Patent Application No. 2014143980.

\* cited by examiner

METHOD AND APPARATUS FOR CHANGING SPACERS

BACKGROUND OF THE INVENTION

The invention relates to a device for mixing at least two materials, especially substances ranging from fluid to pasty.

In particular, when components that react chemically with each other—especially a base material and a curing agent for adhesives—are to be mixed together in proper proportions, mixing devices, especially dynamic ones, are used.

BRIEF SUMMARY OF THE INVENTION

The object of the invention is to propose mixing devices in which a mixing element rotates in a housing and thereby mixes the substances; this makes possible homogenous mixing of the components with precise metering.

This object is accomplished according to the invention with a device that has the features of claim 1.

Preferred and advantageous configurations of the invention are the subject matter of the dependent claims.

Because, in a device according to the invention, the rotating mixing element in the housing of the device is adjustable in the direction of its axis, the gap between the inner surface of the housing and the outer surface of the mixing element can be changed with regards to size. This makes it possible to adjust the shear rate necessary for mixing. Furthermore, the device of the invention functions as a proportional valve, so that the amount of mixture exiting from the device through the discharge opening can be adjusted.

The surfaces of the mixing element and the housing (confining the gap mentioned and facing each other) can be designed to be even or conically tapering in the direction of the discharge opening.

Because, in one configuration of a device according to the invention, the rotating mixing element in the housing is axially adjustable, proportional quantity and pressure regulation, among other things, is possible. This is particularly the case when, on the supply side, an area is provided in which the inner area of the housing and the rotating mixing element are designed to be conically tapering.

With the invention an adjustable yet constant shear rate is produced due to the possibility of changing the size of the gap, regardless of whether it is even or conical.

Because, in one configuration of a mixing device according to the invention, interlocking annular ribs are provided in the feed area of the components, the components (optionally under admission pressure) feeding into the mixing device, of which there are at least two, are prepared for the mixing process. This is also the case because a division of the flows of the components occurs in the rib area.

In a different configuration of the device according to the invention, the possibility of cleansing is provided because of at least one groove or notch or because of at least one rib in the discharge area of the rotating mixing element; this occurs when the rotating mixing element is advanced in the direction of the discharge opening while it is rotating until the gap between the mixing element and the housing is essentially closed (at "zero") (that is, no longer exists). Remnants of (in certain circumstances cured) mixture adhering to the interior of the housing and the exterior of the mixing element are thereby removed via "scraping". In this way the device according to the invention can be used over longer periods of time without requiring special cleaning measures following disassembly of the device.

BRIEF DESCRIPTION OF THE DRAWINGS

Further details and features as well as advantages of the invention will become clear from the following description of preferred configuration examples with reference to the drawing, in which mixing devices are depicted in cutaway view.

DETAILED DESCRIPTION OF THE PREFERRED EMBODIMENTS

Figure 1:
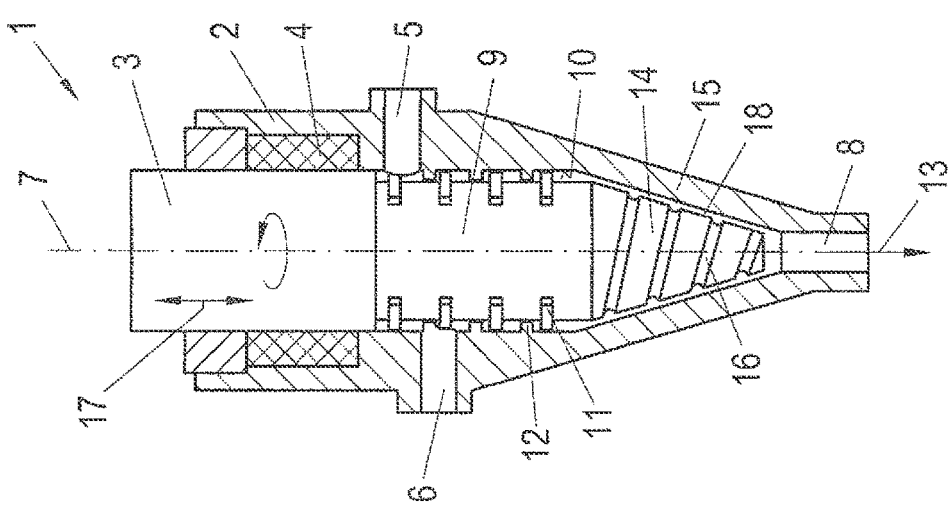
FIG. 1 shows a first configuration of a mixing device.

The device 1 shown in the drawings in FIG. 1 is designed as a dynamic mixing device and is comprised of a housing 2 and a mixing element 3 that is accommodated rotating into the housing 2. The mixing element 3 is coupled to a drive (not shown) so that it may be rotated in the housing 2. The mixing element 3 is sealed with respect to the housing 2 by a stuffing box-like seal 4.

In the housing 2 an opening 5 for feeding a component, especially a base material of an adhesive, is provided, as is an opening 6 opposite this opening 5 for feeding a second component, for example a curing agent for a curing adhesive. The openings 5 and 6 are arranged offset with respect to each other in the direction of the axis 7 of the device 1. In particular, when the components (base material/curing agent) of a two-component adhesive are to be mixed, the opening 6 for the adhesive material is arranged closer to the discharge opening 8 than the opening 5 for the base material.

The components are thoroughly mixed while they travel in the desired proportions of the components that are fed to the device 1 from the openings 5, 6 to the discharge opening 8 of the device 1.

In the region of the feed openings 5, 6 for the components, the rotating mixing element 3 has, a cylindrical area 9, in which ring ribs 11 that are separated from the mixing element 3 outwardly towards the inner surface 10 of the housing 2 are provided. The ring ribs 11 can—as shown—be rings set in the grooves of the mixing element 3. Between the ring ribs 11 separated from the mixing element 3, annular ribs 12 are provided that are separated from the inner surface 10 of the housing 2 inwards. Through collaboration of the ring ribs 11 and the ribs 12, a chopping (mincing) of the supplied components that have been prepared for mixing takes place. This effect, which is advantageous for mixing, can be further enhanced if the ring ribs 11 are outwardly and/or the ribs 12 are inwardly serrated with any tooth shape and spaces between the teeth. These ring ribs 11 and the ribs 12 are admittedly advantageous, but are not required.

Referring to the conveying direction (Arrow 13) to the cylindrical area 9 of the mixing element 3, said element has a conical part 14 that is accommodated in a part 15 of the housing 2 that is also conically tapering towards the discharge opening 8. In the conical part 14 grooves 16 or protruding ribs are provided, for example multiple annular grooves 16 (or ribs) that are placed obliquely to the axis, or a helix-shaped groove (or rib). In this way the inner surface 10 of the housing 2 in the conical area 15 can be cleaned, wherefore the rotating mixing element 7 is advanced in the direction of the discharge opening 8 with a constant reduction of the gap 18 (to "zero") between the outer surface of the conical part 14 of the mixing element 3 and the inner surface of the conical area 15 of the housing 2, so that the conical area 14 rubs on the inner surface 10 of the housing 2 and cleans it.

Figure 2:
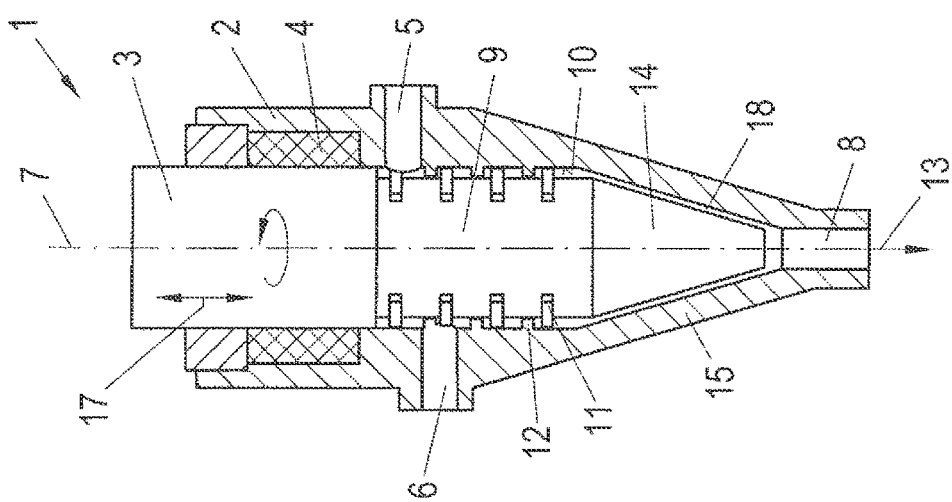
FIG. 2 shows a second configuration of a mixing device.

The configuration of the mixing device 1 according to the invention shown in FIG. 2 corresponds to the configuration described in FIG. 1. The mixing device 1 of FIG. 2 has, however, a mixing element 3 whose conical part 14 is configured with no grooves or ribs—meaning it is largely smooth.

Figure 3:
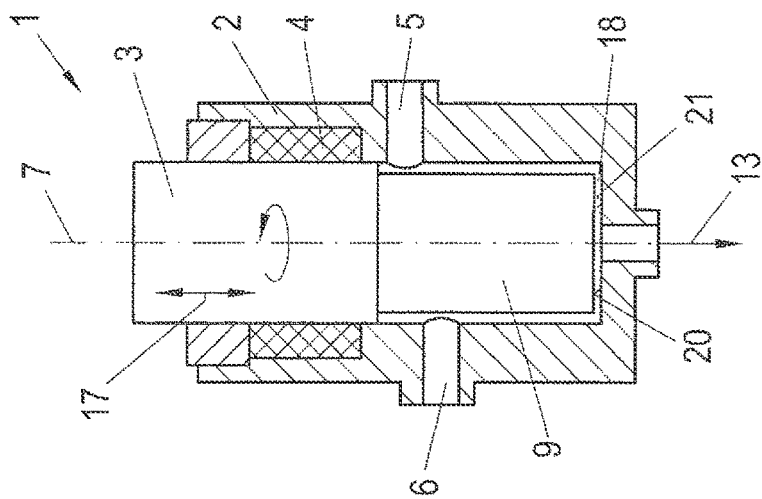
FIG. 3 shows a third configuration of a mixing device.

In the mixing device 1 shown in FIG. 3, the mixing element 3 ends in an even (circular) front surface 20 that faces the discharge opening 8. Together with annular area 21 that encompasses the discharge opening 8, the front surface 20 bounds the even gap 18, whose width can be adjusted by adjusting the mixing element 3 in the axial direction (Arrow 17).

Although neither ring ribs 11 nor ribs 12 are provided in the cylindrical area 9 of the mixing element 3 in the configuration shown in FIG. 3, such ring ribs 11 and ribs 12, as in the configurations of FIGS. 1 and 2, can be provided.

In the configuration of a mixing device 1 shown in FIG. 3, the front surface 20 of the mixing element 3 is smooth. It has, however, been considered for rib-like protrusions on the front surface 20 or grooves or notches in the front surface 20 to be provided, in order to achieve the aforementioned cleaning effect.

The components, in this example the base material and curing agent, are fed under admission pressure into the device 1 according to the invention so that they are conveyed through the device 1.

The axial adjustability of the mixing element 3 with respect to the housing 2 (in the axial direction) also serves to meter the amount of the mixed material exiting out of the discharge opening 8 in the manner of a proportional valve.

The device according to the invention has, in the configurations shown in the drawing—FIGS. 1 to 3, the advantage of ensuring a constant shear rate over the conveying path of the components from the feed opening 5, 6 to the discharge opening 8. This shear rate can, by adjusting the mixing element 3 relative to the housing 2 and thereby altering the gap 18, be adjusted in each case to the best value for the particular mixing process and the characteristics of the components to be mixed.

Additionally, proportional quantity- and pressure regulation is possible thanks to the axial adjustability of the rotating mixing element 3.

Finally, it is possible to clean the device 1 according to the invention by axially adjusting the rotating mixing element 3 in such a way that its conical area 14 is in contact with the inner surface 10 in the conical part 15 of the housing 2 of the device 1.

In summary, a configuration example of the invention can be described as follows:

A device for mixing at least two substances ranging from fluid to pasty has a housing 2 with at least two openings 5, 6 for feeding the substances and with a discharge opening 8, a mixing element 3 which can rotate in the housing 2, which mixing element 3 can be displaced in the direction 17 of its axis 7 in relation to the housing 2 in order to adjust the size of a gap 18 between a conically tapering part 14 of the mixing element 3 and a likewise tapering region 15 of the housing 2 in order to adjust the shear rate in the region of the gap 18. The mixing element 3 has a region 9 in which ring ribs 11 are provided which are separated from the mixing element 3 and which engage between adjacent annular ribs 12 which are separated from the inner surface 10 of the housing 2.

The invention claimed is:

1. A device for mixing at least two materials, comprising:
   a housing (2) with at least a first opening (5) for feeding a first material and a second opening (6) for feeding a second material, a conical part (15), and a discharge opening (8) for discharging the first and second materials as a mixture, the discharge opening (8) being located at an end part of the conical part (15) of the housing (2);
   a mixing element (3) received in the housing and rotatable in the housing, the mixing element (3) having an axis extending along a first direction, the mixing element (3) being rotatable around the first direction of the axis, the mixing element (3) having a cylindrical area (9) and a conical part (14), there being a gap (18) between the conical part (14) of the mixing element (3) and the conical part (15) of the housing (2);
   first ribs (12) extending from an inner surface (10) of the housing (2) toward the cylindrical area (9) of the mixing element (3); and
   second ribs (11) extending from the cylindrical area (9) towards the inner surface (10) of the housing (2), the second ribs extending towards the inner surface (10) of the housing (2) between adjacent ones of the first ribs (12), wherein,
   along the cylindrical area (9), axially inner end portions of the first ribs overlap axially outer end portions of adjacent second ribs in the first direction of the axis, and
   the mixing element (3) is adjustable to advance in the first direction of the axis (7) in relation to the housing (2) for adjusting the size of the gap (18) between the conical part (14) of the mixing element (3) and the conical part (15) of the housing (2), the mixing element (3) being adjustable in the first direction of the axis until the gap is closed.

2. The device according to claim 1, wherein the gap (18) is provided in an area in front of the discharge opening (8).

3. The device according to claim 1, wherein the first opening is located opposite the second opening.

4. The device according to claim 3, wherein the conical part (14) of the mixing element (3) and the conical part (15) of the housing (2) taper in a direction of the discharge opening (8).

5. The device according to claim 2, wherein, during rotation of the mixing element (3) about the axis, the mixing element (3) being adjusted in the first direction of the axis until the gap is closed also closes the discharge opening (8) of the housing (2).

6. The device according to claim 1, wherein the first and second openings (5, 6) are arranged offset with respect to each other in the direction of the axis (7) of the mixing element (3).

7. The device according to claim 1, wherein the second ribs (11) are rings set in grooves in the mixing element (3), each ring having an axially inner portion closest to the axis (7) that is spaced apart and separated from an inner portion of the groove in which the ring is set.

8. The device according to claim 1, wherein free annular surfaces of at least one of the second ribs (11) and the first ribs (12) are serrated.

9. The device according to claim 5, wherein the first ribs (12) are annular ribs (12) integral with the inner surface (10) of the housing (2).

10. The device according to claim 1, wherein the first and second openings (5, 6) are arranged in an area where the second ribs (11) extend from the cylindrical area (9) towards the inner surface (10) of the housing (2).

11. The device according to claim 1, wherein,
the cylindrical area (9) includes grooves,
the second ribs (11) are annular rings (11), and
the annular rings (11) are set in the grooves.

12. The device according to claim 1, wherein at least one of the first ribs (12) and the second ribs (11) have a free annular surface that is toothed.

13. The device according to claim 1, wherein the first ribs (12) are annular ribs connected to the inner surface (11) of the housing (2).

14. The device according to claim 1, wherein the conical part (14) of the mixing element (3) has at least one groove (16) open facing the conical part (15) of the housing (2).

15. The device according to claim 1, wherein the conical part (14) of the mixing element (3) has a helix-shaped groove (16) open facing the conical part (15) of the housing (2).

16. The device according to claim 1, wherein the first opening is located opposite the second opening and the first and second openings (5, 6) are arranged offset with respect to each other in the direction of the axis (7) of the mixing element (3).

17. The device according to claim 1, wherein,
the first opening is located opposite the second opening,
the first and second openings (5, 6) are arranged offset with respect to each other in the direction of the axis (7) of the mixing element (3), and
the first and second openings (5, 6) are arranged in an area where the second ribs (11) extend from the cylindrical area (9) towards the inner surface (10) of the housing (2).

18. A device for mixing two materials, comprising:
a housing (2) with at least a first opening (5) for feeding a first material and a second opening (6) for feeding a second material, a conical part (15), and a discharge opening (8) for discharging the first and second materials as a mixture, the discharge opening (8) being located at an end part of the conical part (15) of the housing (2);
a mixing element (3) received in the housing, the mixing element (3) having an axis extending along a first direction, the mixing element (3) being rotatable around the first direction of the axis, the mixing element (3) having a cylindrical area (9) adjacent a conical part (14), the cylindrical area (9) including grooves, there being a gap (18) between the conical part (14) of the mixing element (3) and the conical part (15) of the housing (2) and in an area in front of the discharge opening (8);
first ribs (12) extending from an inner surface (10) of the housing (2) toward the cylindrical area (9) if the mixing element (3); and
second ribs (11) set in the grooves of the cylindrical area of the mixing element (3), the second ribs extending from the cylindrical area (9) towards the inner surface (10) of the housing (2), the second ribs extending towards the inner surface (10) of the housing (2) between adjacent ones of the first ribs (12), wherein,
along the cylindrical area (9), axially inner end portions of the first ribs overlap axially outer end portions of adjacent second ribs in the first direction of the axis, each second rib has an axially inner portion closest to the axis (7) that is spaced apart and separated from an inner portion of the groove in which the second rib is set,
the first and second openings (5, 6) are arranged in an area where the second ribs (11) extend from the cylindrical area (9) towards the inner surface (10) of the housing (2),
the mixing element (3) is adjustable to advance in the first direction of the axis (7) in relation to the housing (2) for adjusting the size of the gap (18) between the conical part (14) of the mixing element (3) and the conical part (15) of the housing (2), the mixing element (3) being adjustable, by movement in the first direction of the axis during rotation about the axis, until the gap is closed and the discharge opening (8) of the housing (2) is also closed thereby closing the discharge opening (8) of the housing (2).

19. The device according to claim 18, wherein the conical part (14) of the mixing element (3) has a helix-shaped groove (16) open facing the conical part (15) of the housing (2).

* * * * *